Figure 1:
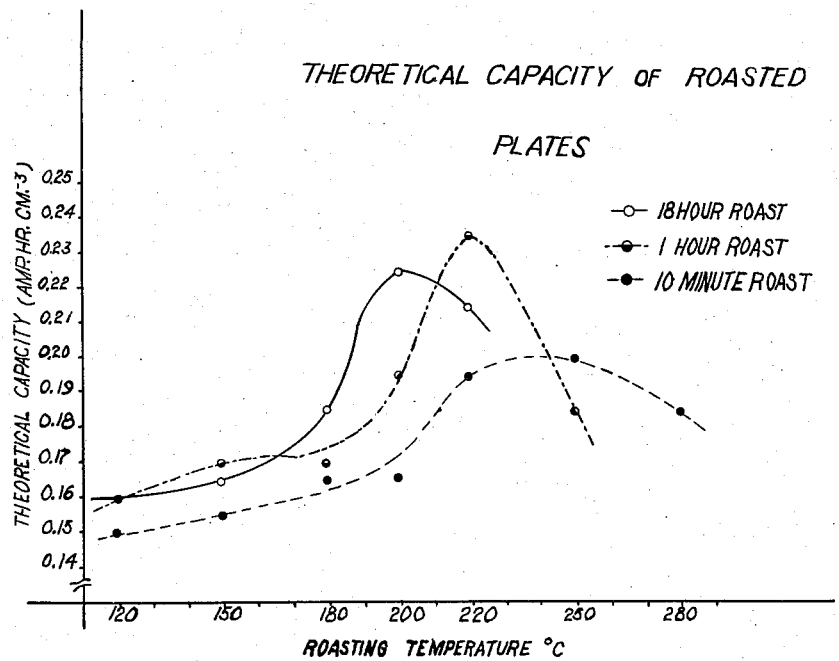

INVENTORS
PIERRE L. BOURGAULT
PHYLLIS E. LAKE
EDMUND J. CASEY

United States Patent Office 2,831,044
Patented Apr. 15, 1958

2,831,044

METHOD OF IMPREGNATION OF POSITIVE PLATES BY THERMAL DECOMPOSITION OF AQUEOUS NICKEL NITRATE

Pierre L. Bourgault and Phyllis E. Lake, Ottawa, Ontario, and Edmund J. Casey, Almonte, Ontario, Canada, assignors to Her Majesty The Queen in the Right of Canada as represented by the Minister of National Defence Application December 13, 1956, Serial No. 628,080

13 Claims. (Cl. 136—29)

The present invention relates generally to the impregnation of nickel plaques with nickel hydroxide and is more particularly concerned with the preparation of positive plates suitable for use in nickel-cadmium storage batteries.

The positive plates of nickel-cadmium storage batteries are normally constructed of porous sintered nickel plaques which have been impregnated with nickel hydroxide. The conventional impregnation procedure involves immersing a sintered porous nickel plaque in nickel nitrate followed by electrolytic conversion of the nickel nitrate to nickel hydroxide by making the loaded plaque the cathode in a bath of hot caustic material (usually a hot KOH or NaOH solution) between two metallic anodes (usually nickel sheets) and electrolysing at a current of about 0.5 amp. in.$^{-2}$. The thus-treated plaques are then washed and dried. The nickel plaques to be treated may first be immersed in an aqueous solution of nickel nitrate or alternatively they may be immersed in a molten bath of nickel nitrate hexahydrate. In either case reduced pressure and elevated temperatures may be used to speed the penetration of the nickel nitrate into the pores of the plaque.

While the impregnation procedures involving electrolysis appear from what has just been said to be simple enough, in point of fact a single electrolytic procedure will not provide a plate having an electrical capacity which warrants use of the plate in a nickel-cadmium battery. Therefore, it has been the practice to repeat the impregnation procedure some four times in the commercial production of positive battery plates. The process is therefore both time consuming and expensive.

An object of the present invention is therefore to provide a method of impregnating a porous sintered nickel plaque with nickel hydroxide in which a single impregnation cycle produces plates having capacities comparing favourably with those which have previously been commercially produced by an electrolytic procedure involving four impregnation cycles.

More specifically an object of the invention is to replace the electrolytic steps described above by a thermal decomposition procedure.

A further object of the invention is to provide a method of impregnating a porous sintered nickel plaque with nickel hydroxide which greatly simplifies the overall procedures.

It has been our experience that in carrying out the electrolytic method, the conversion following the immersion in the molten salt bath is accompanied by severe shedding of active material so that the electrolytic conversion step results in the loss of a good deal of the effect of the immersion step. According to the present invention, however, the conversion is accomplished without this loss of active material.

Our present contribution to the art may be generally defined as a method of impregnating a porous sintered nickel plaque with nickel hydroxide which comprises immersing the plaque in a molten bath of $Ni(NO_3)_2 \cdot 6H_2O$, taking the plaque which has been subjected to said immersion and roasting it at a temperature of from about 180° C. to about 250° C. for a period of at least about ten minutes, whereby to decompose the nickel nitrate into a product intermediate between nickel nitrate and nickel hydroxide, and converting said intermediate product into nickel hydroxide by immersing the plaque in hot concentrated caustic solution, prior to washing and drying the thus-treated plaque.

Figure 2:
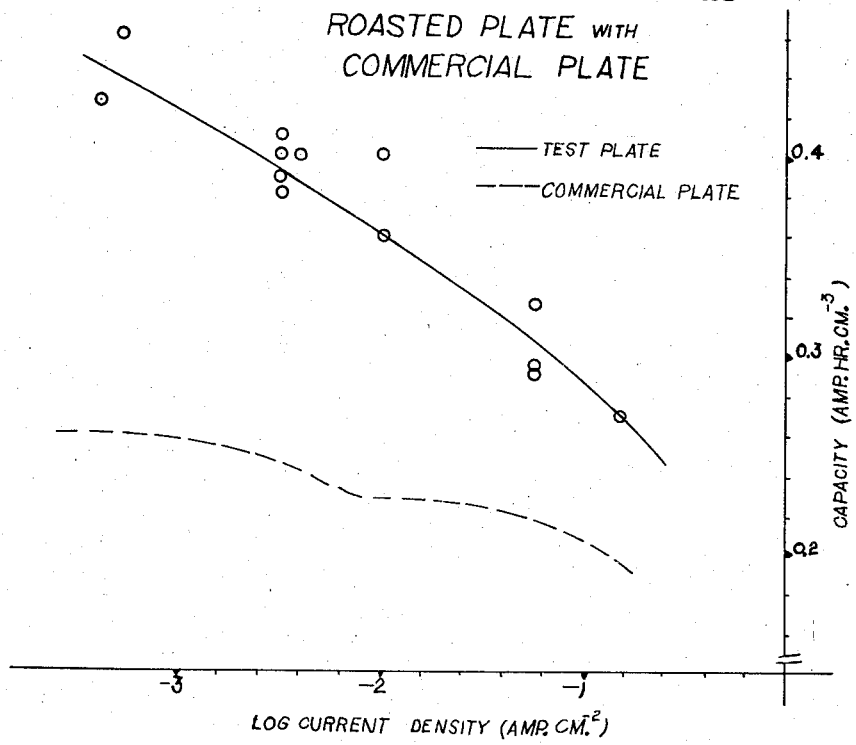

The above and other objects and features of the invention will appear from the following detailed description of the invention with reference to the attached drawing in which Figure 1 is a graph showing the relationship of roasting temperature to theoretical capacity for roasts of various lengths, and Figure 2 is a graph comparing a plate which has been doubly impregnated by the thermal decomposition method of the invention with a plate which has been produced commercially according to one of the electrolytic procedures of the prior art.

The method of the invention can be practiced with porous sintered nickel plaques of the type which is already commercially available, but may also be practiced with any porous conducting matrix. Such plaques are usually about 80% porous, i. e., have 80% free volume. In practicing the invention, the nickel plaques of this type are immersed in $Ni(NO_3)_2 \cdot 6H_2O$ which is in the molten state, i. e., is dissolved in its own water of crystallization at elevated temperatures. The bath may be under normal atmospheric pressure, in which case a bath temperature of about 85° C. to about 115° C. and an immersion period of 2 hours is recommended. The immersion period can, however, be speeded up by carrying out the initial immersion under reduced pressure. With this second vacuum procedure and with a bath temperature of about 85° C. to about 125° C., four minutes immersion under reduced pressure followed by six minutes immersion at atmospheric pressure will be found to suffice. The reduced pressure employed should be slightly greater than the vapour pressure of the solution at the temperature of the bath. We have observed that increasing the immersion temperature and increasing the immersion period tends to increase the theoretical capacity of the resulting plates.

The plaques which have been thus impregnated with nickel nitrate are quickly transferred to a suitable oven or furnace where they are roasted. While we have found that roasting periods of widely differing lengths could be employed, we noted that there existed a fairly well defined temperature range within which the roasting should be conducted if the resulting plates were to have worthwhile theoretical capacities. According to our experiments this recommended roasting temperature range is from about 180° C. to about 250° C.

At temperatures well below this recommended range, considerable amounts of liquid $Ni(NO_3)_2 \cdot 6H_2O$ are lost from the plaque during roasting because the outer layer is not decomposed sufficiently quickly to seal the remainder of the liquid in the plaque. Furthermore, the nickel nitrate which has not been successfully converted to the intermediate form during roasting may be leached out or forced out physically during the subsequent immersion in hot caustic solutions. At temperatures just below the recommended temperature range, the plaques tend to develop blisters and this blistering seems to lead to early disintegration when the loaded plates are employed in batteries.

At temperatures above the recommended range, a fraction of the nickel nitrate was completely decomposed to the form of NiO. Unfortunately, the NiO form cannot be activated. Thus, although no material is lost from the plates roasted at the temperatures above the recommended range, some of the nickel is rendered electrically passive so that these higher temperatures should of course be avoided.

We further found that, when working within the recommended range, for each roasting period there appears to be an optimum temperature at which the highest capacity plates are produced. Figure 1 shows a typical set of theoretical capacities (based on weight gain during processing) plotted against decomposition temperature. Curves are given for roasting times of ten minutes, one hour, and 18 hours. It can be noted from the graphs that in these cases just mentioned, the optimum roasting temperatures are about 200° C. about 220° C. and about 240° C., respectively. It is our present belief that these optimum results with regard to theoretical capacities are attributable to the fact that, given optimum conditions as to roasting temperature and roasting time, the $Ni(NO_3)_2 \cdot 6H_2O$ all, or nearly all, decomposes to form a solid intermediate whose weight is consistent with the formula $Ni(OH)NO_3$. It is believed that the reaction in question proceeds according to the following equation:

$$2Ni(NO_3)_2 \cdot 6H_2O \rightarrow 2Ni(OH)NO_3 + 2NO_2 + 5H_2O + \tfrac{1}{2}O_2$$

Whatever may be the exact nature of the reaction involved and the exact form of the intermediate, the important thing is that the intermediate, when immersed in hot aqueous caustic solution, converts rapidly to electrically-active nickel hydroxide.

While the conversion to $Ni(OH)_2$ may be effected with sodium hydroxide, we preferably employ potassium hydroxide. Preferably the potassium hydroxide bath is held at a temperature of between about 75° C. and about 85° C. and has a specific gravity of from about 1.24 to about 1.38.

We have found that under the following conditions plates having capacities of up to 0.26 amp. per hour per cubic centimeter can be prepared according to the invention with a single impregnation. Sintered porous nickel plaques are readied by degreasing them in warm acetone and are then immersed in nickel nitrate hexahydrate dissolved in its own water of crystallization at 115° C. The plaques are immersed for 10 minutes the first four minutes of immersion being under reduced pressure. The plaques thus loaded with nickel nitrate hexahydrate are rapidly transferred to an oven where they are heated in air at 230° C. for one hour. They are then rapidly transferred to a solution of hot aqueous KOH at a temperature of 75 to 80° C. They remain in the bath of KOH for about 1 hour whereafter they are washed in batches in distilled water at room temperature until the pH of the drip water is approximately 7.0. The water is changed every 15 minutes and the washing is continued for a period of about 2 hours. The washed plates are then dried in air in an oven held at 95° C. The drying is continued until constant weight is achieved, which usually takes about 2 hours.

Plates produced according to the single impregnation process just described compare reasonably favourably with standard commercial battery plates which have been prepared by the electrolytic method of the prior art and wherein four impregnation cycles have been employed.

When higher capacities are desired of plates produced according to the invention, it is only necessary to repeat the impregnation process once. Double impregnation according to the process of the invention produces much higher capacities than those to be found in currently available commercial plates produced according to the electrolytic procedure. Unfortunately, however, the doubly-impregnated plates produced according to our invention have comparatively short useful lives since they tend to disintegrate. Nevertheless, these doubly-impregnated plates featuring high capacity would be advantageous in cases where high capacity was desired and a long cycle life was not necessary. Figure 2 graphically compares the capacity of a plate which has been doubly impregnated according to the invention with that of a commercially produced plate, whence it may be noted that at various current densities our plate outperforms the commercial plate.

It was found that certain plates made according to the invention failed to develop real capacities which were anything more than a fraction of the theoretical capacity, despite the fact that the plates were formed from plaques which have been treated under nearly optimum conditions. While we are at a loss to account for this aberration, we found that, fortunately, whenever it did occur, it could be cured by adding a small amount of lithium hydroxide to the potassium hydroxide electrolyte of the cell where the plates were employed.

What we claim as our invention is:

1. A method of impregnating a porous sintered nickel plaque with nickel hydroxide which comprises immersing the plaque in a molten bath of $Ni(NO_3)_2 \cdot 6H_2O$, roasting the plaque which has been subjected to said immersion, at a temperature of from about 180° C. to about 250° C. for a period of at least about ten minutes, whereby to decompose the nickel nitrate into a product intermediate between nickel nitrate and nickel hydroxide, and converting said intermediate product into nickel hydroxide by immersing the plaque in hot concentrated caustic solution, prior to washing and drying the thus-treated plaque.

2. A method as defined in claim 1 wherein at least part of the immersion in molten $Ni(NO_3)_2 \cdot 6H_2O$ occurs under reduced pressure.

3. A method as defined in claim 1, wherein the hot caustic solution is a bath of potasisum hydroxide.

4. A method as defined in claim 1, wherein the molten $Ni(NO_3)_2 \cdot 6H_2O$ is at a temperature of from about 85° C. to about 115° C. and the immersion period is about two hours.

5. A method as defined in claim 1, wherein part of the immersion in $Ni(NO_3)_2 \cdot 6H_2O$ occurs under reduced pressure and at a temperature of about 85° C. to 125° C., the immersion period being about ten minutes.

6. A method of producing a high capacity positive plate for a nickel-cadmium storage battery which comprises twice subjecting a nickel plaque to the impregnation procedure defined in claim 1.

7. A method as defined in claim 1, in which the heated plaque is immersed for at least one hour in an aqueous solution of KOH having a temperature of between about 75° C. to about 85° C.

8. A method as defined in claim 1, in which the plaque is heated at a temperature of about 220° C. for about 1 hour.

9. A method as defined in claim 1, in which the plaque is heated at a temperature of about 240° C. for a period of about 10 minutes.

10. A method as defined in claim 1, in which the plaque is heated at a temperature of about 220° C. for a period of about 18 hours.

11. A method as defined in claim 7, in which the KOH solution had a specific gravity of from about 1.24 to about 1.38.

12. A method of impregnating a porous sintered nickel plaque with nickel hydroxide which comprises immersing the plaque in $Ni(NO_3)_2 \cdot 6H_2O$ held at about 115° C. for at least about 10 minutes, heating the immersed plaque in air at about 230° C. for about one hour, immersing the heated plaque for about one hour in aqueous potassium hydroxide bath held at a temperature of from about 75° C. to about 85° C., and washing and drying the thus treated plaque.

13. A method as defined in claim 12 in which at least part of the immersion in $Ni(NO_3)_2 \cdot 6H_2O$ occurs under reduced pressure.

No references cited.